(12) United States Patent
Li et al.

(10) Patent No.: US 11,508,034 B2
(45) Date of Patent: Nov. 22, 2022

(54) WHITE BACKGROUND PROTECTION IN SRGAN BASED SUPER RESOLUTION

(71) Applicant: KYOCERA Document Solutions Inc., Osaka (JP)

(72) Inventors: Sheng Li, Irvine, CA (US); Dongpei Su, Palos Verdes, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 117 days.

(21) Appl. No.: 17/157,990

(22) Filed: Jan. 25, 2021

(65) Prior Publication Data
US 2022/0237742 A1   Jul. 28, 2022

(51) Int. Cl.
| | |
|---|---|
| *G06T 3/40* | (2006.01) |
| *G06T 5/50* | (2006.01) |
| *G06T 7/194* | (2017.01) |
| *G06T 7/11* | (2017.01) |
| *G06T 7/136* | (2017.01) |

(52) U.S. Cl.
CPC .......... *G06T 3/4053* (2013.01); *G06T 3/4007* (2013.01); *G06T 3/4046* (2013.01); *G06T 5/50* (2013.01); *G06T 7/11* (2017.01); *G06T 7/136* (2017.01); *G06T 7/194* (2017.01); *G06T 2207/20016* (2013.01); *G06T 2207/30176* (2013.01)

(58) Field of Classification Search
CPC ....... G06T 3/4053; G06T 3/4046; G06T 7/10; G06T 7/11; G06T 7/136; G06T 7/194; G06T 2207/10008; G06T 2207/30176; G06T 3/4007; G06T 5/50; G06T 2207/20016; G06T 2207/20081; G06T 2207/20084; G06T 5/001; G06T 5/005; G06V 30/148; G06V 10/10; G06V 10/245; G06V 30/10; G06K 9/00; G06N 3/02–088
USPC ................................ 382/156–158, 176, 274
See application file for complete search history.

(56) References Cited

U.S. PATENT DOCUMENTS

| | | | |
|---|---|---|---|
| 7,536,052 B2 | 5/2009 | Saber et al. | |
| 2019/0114743 A1* | 4/2019 | Lund ................... | G06V 30/1444 |

OTHER PUBLICATIONS

Lat, Ankit, and C. V. Jawahar. "Enhancing OCR accuracy with super resolution." 2018 24th International Conference on Pattern Recognition (ICPR). IEEE, 2018. (Year: 2018).*

(Continued)

*Primary Examiner* — Geoffrey E Summers
(74) *Attorney, Agent, or Firm* — GrowIP Law Group LLC

(57) ABSTRACT

Systems and methods for processing images receive an input image. The systems and methods provide the input image to a first module to increase a resolution of the input image to produce an upscaled image. The systems and methods detect white pixels in the input image. The systems and methods generate a mask associated with the input image. The mask includes mask bits that are set to mark the white pixels in the input image. The systems and methods upscale the mask to produce an upscaled mask matching a resolution of the upscaled image. The systems and methods identify target pixels of the upscaled image that correspond to the set mask bits in the upscaled mask. The systems and methods modify the upscaled image to produce an output image by replacing target pixels of the upscaled image with a replacement pixel having greater whiteness. The systems and methods output the output image.

20 Claims, 6 Drawing Sheets

(56) References Cited

OTHER PUBLICATIONS

Lin, Kai, et al. "Text Image Super-Resolution by Image Matting and Text Label Supervision." 2019 IEEE/CVF Conference on Computer Vision and Pattern Recognition Workshops (CVPRW). IEEE, 2019. (Year: 2020).*
Peng, Xujun, and Chao Wang. "Building super-resolution image generator for OCR accuracy improvement." International Workshop on Document Analysis Systems. Springer, Cham, 2020. (Year: 2020).*
Sauvola, Jaakko, and Matti Pietikäinen. "Adaptive document image binarization." Pattern recognition 33.2 (2000): 225-236. (Year: 2000).*
Yu, Xiang, and Yupin Luo. "Stratification-based super-resolution algorithm for document processing." 2017 2nd International Conference on Image, Vision and Computing (ICIVC). IEEE, 2017. (Year: 2017).*
Zheng, Yun, et al. "Real-time document image super-resolution by fast matting." 2014 11th IAPR International Workshop on Document Analysis Systems. IEEE, 2014. (Year: 2014).*

\* cited by examiner

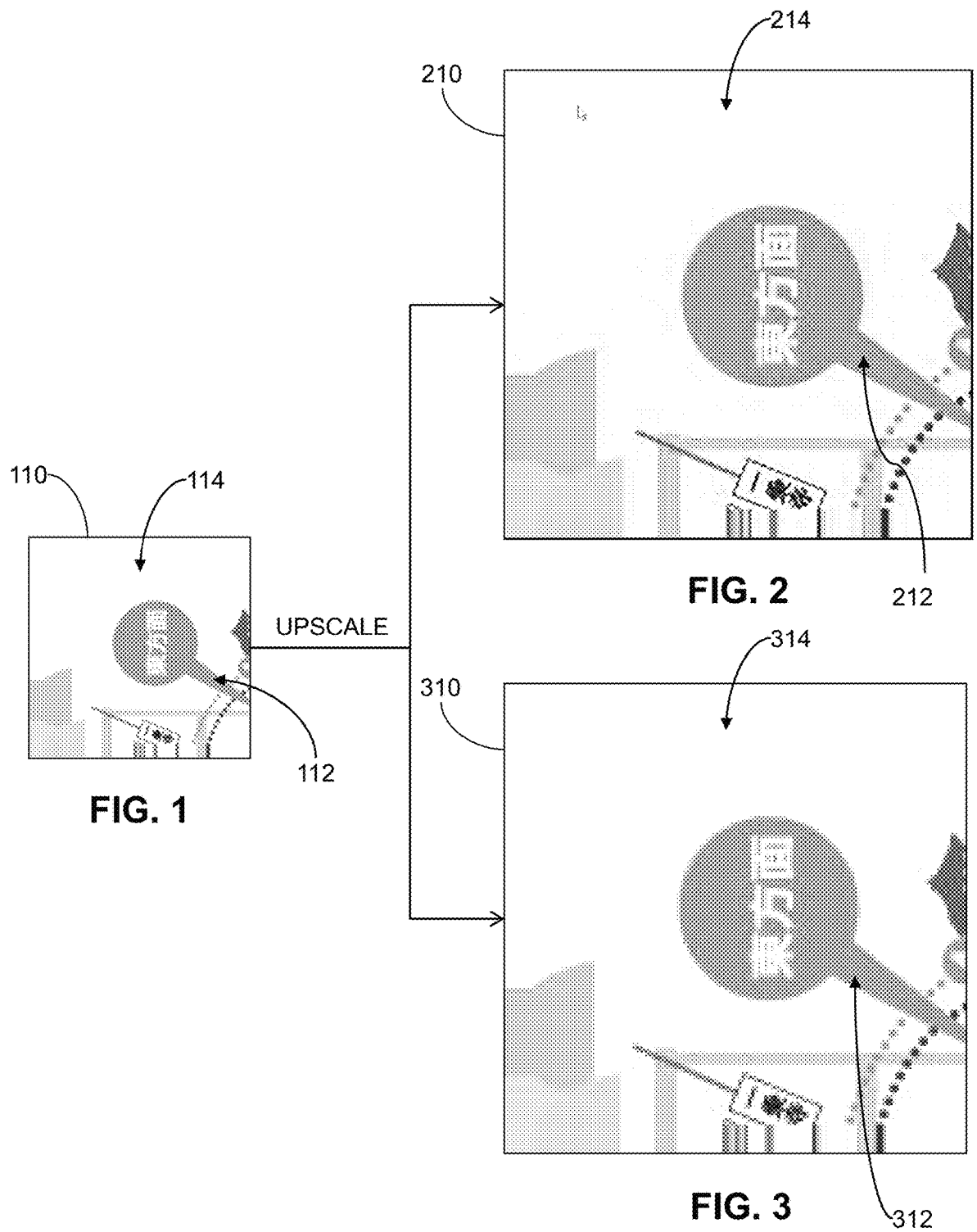

WHITE BACKGROUND PROTECTION IN SRGAN BASED SUPER RESOLUTION

BACKGROUND

In image processing, super-resolution (SR) refers to a class of techniques for increasing the resolution of an imaging system. In a typical scenario, a SR system receives an input image and upscales the input image to a higher resolution output image. Prior to the upscaling, the details of the higher resolution output image are essentially unknown. The SR system operates by estimating the details of the higher resolution output image from characteristics of the input image.

There are various approaches for estimating a high-resolution (HR) image from its low-resolution (LR) image. For example, with the nearest neighbor approach, the color of a newly-created pixel in the HR image is determined based on the color of a nearest pixel in the LR image. With the bilinear and bicubic approaches, colors for newly-created pixels in the HR image are interpolated from colors of surrounding pixels in the LR image.

Other approaches estimate a HR image from its LR image using machine learning. For example, some approaches utilize convolutional neural networks (CNNs) to establish a mapping between LR image information and HR image information. CNNs are neural networks that include multiple layers, and use convolution in at least one of the layers. More specifically, CNNs include convolution layers that perform a convolution by sliding a filter, referred to as a convolution filter, over an input. As a simplified example, the input may be a 10×10 matrix of input values, and the convolution filter may be a 3×3 matrix of filter values. At each slide position, the convolution layer performs a matrix multiplication between the convolution filter and the portion of the input identified by the slide position. The portion identified by the slide position is referred to as the receptive field. The resulting sum is then added to a feature map at a position corresponding to the receptive field.

A Super-Resolution Generative Adversarial Network (SRGAN) is a machine learning system that uses two competing neural networks in order to generate synthetic SR images that appear to be real images. The two competing neural networks are referred to as a generator network and a discriminator network. The generator network is a CNN that receives a LR image as input and generates a HR image as output. The discriminator network is a separate CNN that is trained to distinguish SR images generated by the generator network from real images. During a training process, the generator network and the discriminator network can be optimized in an alternating manner, such that the generator network learns to generate SR images that are very similar to real images and, as such, difficult for the discriminator network to distinguish from real images. After sufficient training, the generator network can be used for SR.

SUMMARY

An example method for processing images includes receiving an input image. The example method includes providing the input image as input to a first module implemented on a computer processing system and configured to increase a resolution of the input image to produce a first upscaled image. The example method includes detecting, with the computer processing system, white pixels in the input image. The example method includes generating, with the computer processing system, a mask associated with the input image. The mask includes mask bits and one or more of the mask bits are set to mark the white pixels in the input image. The example method includes upscaling, with the computer processing system, the mask to produce an upscaled mask matching a resolution of the first upscaled image. The example method includes identifying, with the computer processing system, one or more target pixels of the first upscaled image that correspond to the one or more set mask bits in the upscaled mask. The example method includes modifying, with the computer processing system, the first upscaled image to produce an output image by replacing one or more of the target pixels of the first upscaled image with a replacement pixel having greater whiteness. The example method includes outputting, by the computer processing system, the output image.

An example system for processing images includes one or more computer storage devices configured to store a first module configured to increase a resolution of an input image to produce a first upscaled image. The example system includes one or more processors configured to execute instructions. The instructions cause the one or more processors to receive the input image. The instructions cause the one or more processors to provide the input image as input to the first module to produce the first upscaled image. The instructions cause the one or more processors to detect white pixels in the input image. The instructions cause the one or more processors to generate a mask associated with the input image. The mask includes mask bits and one or more of the mask bits are set to mark the white pixels in the input image. The instructions cause the one or more processors to upscale the mask to produce an upscaled mask matching a resolution of the first upscaled image. The instructions cause the one or more processors to identify one or more target pixels of the first upscaled image that correspond to the one or more set mask bits in the upscaled mask. The instructions cause the one or more processors to modify the first upscaled image to produce an output image by replacing one or more of the target pixels of the first upscaled image with a replacement pixel having greater whiteness. The instructions cause the one or more processors to output the output image.

One or more example non-transitory computer-readable storage media have computer-executable instructions stored thereon. When executed by one or more processors, the computer-executable instructions cause the one or more processors to receive an input image. The computer-executable instructions cause the one or more processors to provide the input image as input to a first module configured to increase a resolution of the input image to produce a first upscaled image. The computer-executable instructions cause the one or more processors to detect white pixels in the input image. The computer-executable instructions cause the one or more processors to generate a mask associated with the input image. The mask includes mask bits and one or more of the mask bits are set to mark the white pixels in the input image. The computer-executable instructions cause the one or more processors to upscale the mask to produce an upscaled mask matching a resolution of the first upscaled image. The computer-executable instructions cause the one or more processors to identify one or more target pixels of the first upscaled image that correspond to the one or more set mask bits in the upscaled mask. The computer-executable instructions cause the one or more processors to modify the first upscaled image to produce an output image by replacing one or more of the target pixels of the first upscaled image with a replacement pixel having greater whiteness. The computer-executable instructions cause the one or more processors to output the output image.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures, wherein:

FIG. 1 illustrates an example input image for a print job.

FIG. 2 illustrates an example image produced by upscaling the input image of FIG. 1 by a Super-Resolution Generative Adversarial Network (SRGAN).

FIG. 3 illustrates an example image produced by upscaling the input image of FIG. 1 with nearest neighbor interpolation.

DETAILED DESCRIPTION

Figure 4:
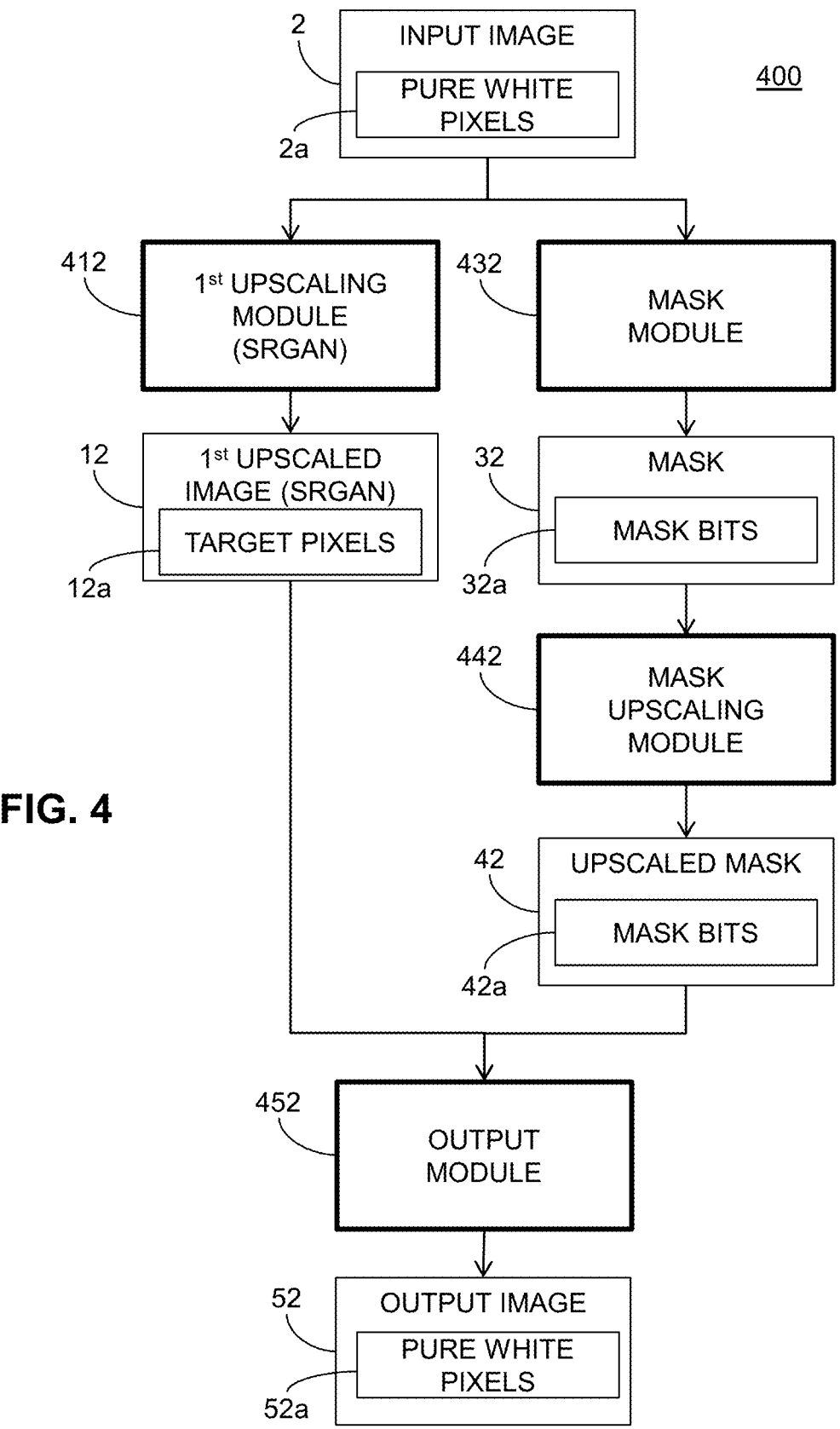
FIG. 4 illustrates an example system for upscaling an input image, while protecting white areas in the input image.

FIG. 1 illustrates an example input image 110 (low-resolution (LR) image) for a print job. Among other possible processing steps, the print job may upscale the input image 110 to a higher resolution (high-resolution (HR) image). The input image 110 includes: (i) non-white components 112 defined by an arrangement of black or colored text, lines, and shapes, and (ii) white areas 114 in the background. The white areas 114 may include areas of pure white and/or near white.

A Super-Resolution Generative Adversarial Network (SRGAN) can be employed to upscale the input image 110, by a multiple of four (4X) for instance, to produce an example upscaled image 210 as shown in FIG. 2. The upscaled image 210 includes: (i) non-white components 212 that correspond to the non-white components 112 of the input image 110, and (ii) white areas 214 that correspond to the white areas 114 of the input image 110.

Alternatively, nearest neighbor interpolation can be employed to upscale the input image 110, by 4X for instance, to output an upscaled image 310 as shown in FIG. 3. The upscaled image 310 includes: (i) non-white components 312 that correspond to the non-white components 112 of the input image 110, and (ii) white areas 314 that correspond to the white areas 114 of the input image 110.

A comparison of FIGS. 1-3 reveals that the non-white components 212 (e.g., text and lines) of the upscaled image 210 (SRGAN) reproduce the non-white components 112 of the input image 110 with better image quality than the non-white components 312 of the upscaled image 310 (nearest neighbor interpolation). However, the white areas 314 of the upscaled image 310 (nearest neighbor interpolation) provide a better reproduction of the white areas 114 of the input image 110 than the white areas 214 of the upscaled image 210 (SRGAN). In particular, the white areas 214 produced by the SRGAN appear more greyish than the white areas 314 produced by nearest neighbor interpolation. In terms of image quality, a SRGAN has been found to be more effective at upscaling good quality, natural images (with richer local covariance structure), but less effective at upscaling artificial images with large white areas in the background. Although it may be desirable to upscale images with a SRGAN to obtain better image quality for non-white components, there is a need to improve the white areas in images upscaled with the SRGAN. In particular, there is a need for approaches that can upscale artificial images as well as natural images.

FIG. 4 illustrates an example system 400 for processing an input image 2 (e.g., for a print job). The system 400 includes a first upscaling module 412 that receives the input image 2 and increases a resolution of the input image 2 to produce a first upscaled image 12. In particular, the first upscaling module 412 increases the resolution of the input image 2 by employing a SRGAN. By employing the SRGAN, however, the first upscaled image 12 might not effectively reproduce white areas of the input image 2 as described above.

The system 400 also includes a mask module 432 that generates a mask 32 associated with the input image 2. In particular, the mask module 432 detects pure white pixels 2a in the input image 2 and generates the mask 32 based on the detected pure white pixels 2a. For instance, the mask module 432 detects the pure white pixels 2a in the input image 2 by detecting the pixels with a red-green-blue (RGB) value of (255, 255, 255). The mask 32 includes mask bits 32a and one or more of the mask bits 32a are set to mark the pure white pixels 2a detected in the input image 2.

Furthermore, the system 400 includes a mask upscaling module 442 that upscales the mask 32 to produce an upscaled mask 42 matching a resolution of the first upscaled image 12. For instance, the first upscaling module 412 may upscale the input image 2 by 4X, and the mask upscaling module 442 may correspondingly upscale the mask 32 by 4X. Upscaling the mask 32 may involve replicating the mask bits 32a of the mask 32 along two perpendicular axes (e.g., x-direction and y-direction) to match the resolution of the first upscaled image 12. The upscaled mask 42 includes mask bits 42a that are set to mark the pure white pixels 2a detected in the input image 2.

The system 400 also includes an output module 452 that receives the first upscaled image 12 from the first upscaling module 412 and the upscaled mask 42 from the mask upscaling module 442. Evaluating the one or more set mask bits 42a of the upscaled mask 42, the output module 452 identifies one or more target pixels 12a of the first upscaled image 12 that correspond to the pure white pixels 2a detected in the input image 2. As described above, because the target pixels 12a are produced by the SRGAN, the target pixels 12a might not effectively reproduce the pure white pixels 2a of the input image 2. Thus, the output module 452 modifies the first upscaled image 12 to produce an output image 52 by replacing the target pixels 12a with replacement pixels 52a having greater whiteness. In the system 400, the replacement pixel 52a for each of the target pixels 12a has the RGB value of (255, 255, 255). In other words, the target pixels 12a in the first upscaled image 12 are replaced with pure white pixels 52a to effectively reproduce pure white pixels 2a of the input image 2. The system 400 protects the pure white pixels 2a of the input image 2.

Figure 5:
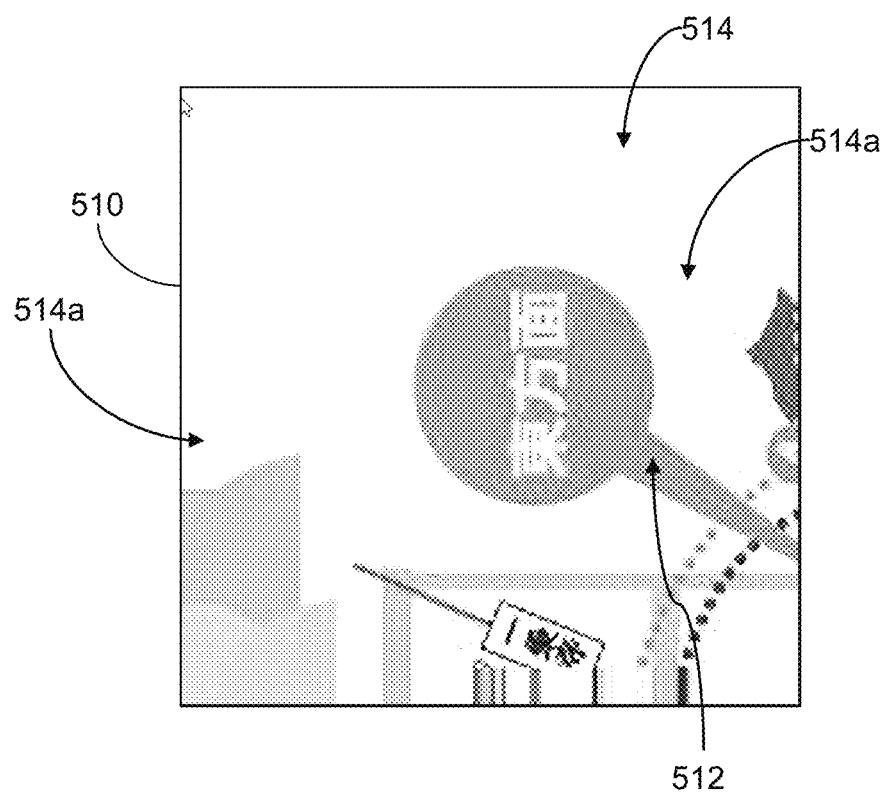
FIG. 5 illustrates an example image produced by applying a mask based only on pure white pixels of the input image of FIG. 1 to the upscaled image of FIG. 2 produced by the SRGAN.

In some cases, however, some of the pixels of an input image may be near white rather than pure white (e.g., RGB value of (255, 255, 255)). For instance, scanned artificial images typically include larger areas of near white pixels instead of pure white pixels. A mask based only on pure white pixels of the input image does not protect near white pixels of the input image. FIG. 5 illustrates an upscaled image 510 produced by applying a mask to the upscaled image 210 produced by the SRGAN, where the mask bits only mark pure white pixels of the input image 110. The upscaled image 510 includes white areas 514 with pure white pixels based on the mask while near white pixels reproduced by the SRGAN remain. The near white pixels reproduced by the SRGAN are more greyish relative to corresponding near white pixels of the input image 110. Furthermore, the differences between neighboring pure white pixels from the mask and near white pixels produced by the SRGAN are exaggerated, creating artifacts 514a in the upscaled image 510.

Figure 6A:
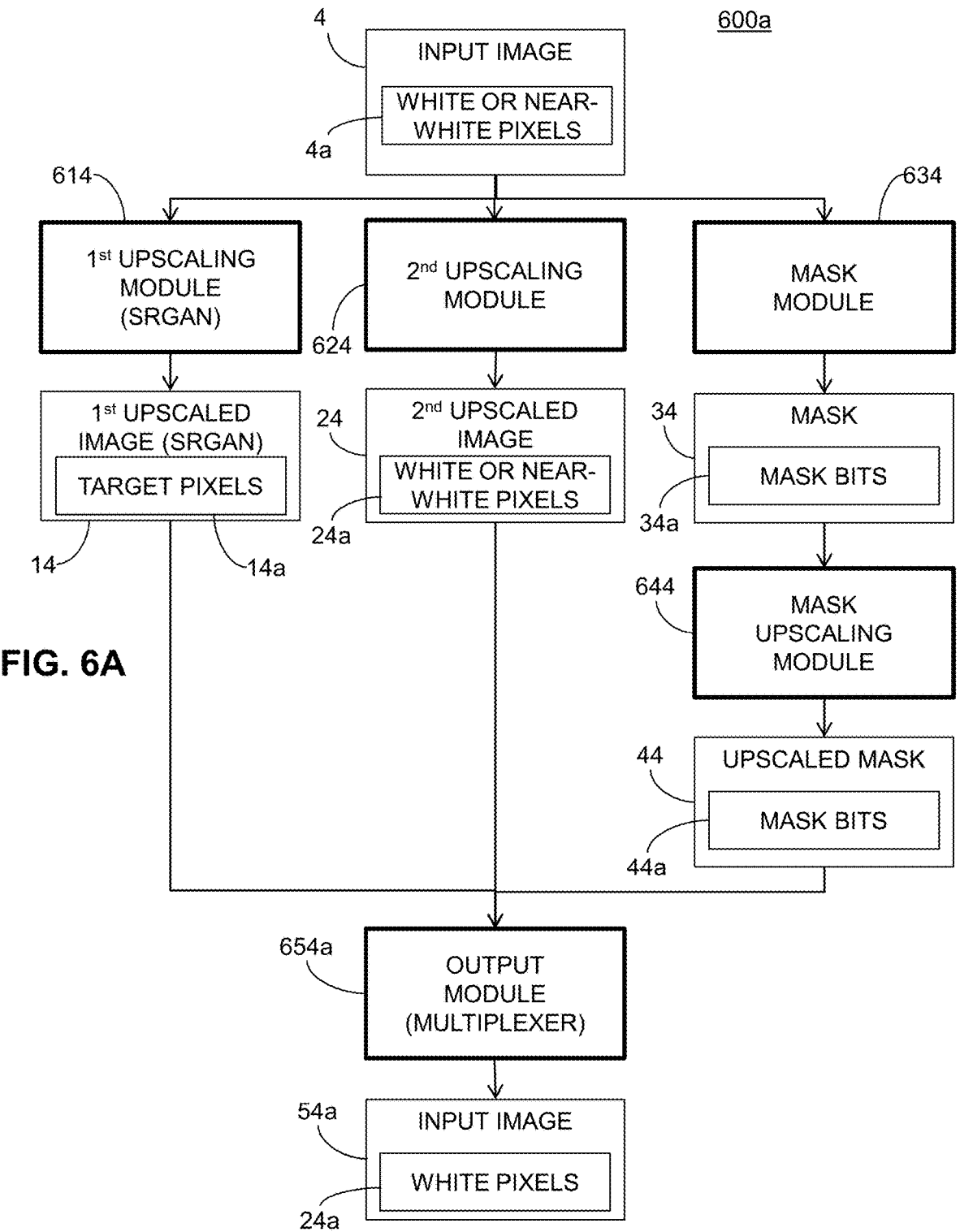
FIG. 6A illustrates another example system for processing an input image, while protecting white areas in the input image.

FIG. 6A illustrates another example system 600a for processing an input image 4 (e.g., for a print job). The system 600a includes a first upscaling module 614 that receives the input image 4 and increases a resolution of the input image 4 to produce a first upscaled image 14. In particular, the first upscaling module 614 increases the resolution of the input image 4 by employing a SRGAN. By employing the SRGAN, however, the first upscaled image 14 might not effectively reproduce white areas (pure white and near white) of the input image 4 as described above.

Additionally, the system 600a includes a second upscaling module 624 that also receives the input image 4 and increases a resolution of the input image 4 to produce a second upscaled image 24 matching the resolution of the first upscaled image 14. In particular, the second upscaling module 624 increases the resolution of the input image 4 by using nearest neighbor interpolation or bilinear interpolation as described above, as an alternative to the SRGAN. In contrast to the first upscaled image 14, the second upscaled image 24 includes white pixels 24a that reproduce white areas (pure white and near white) of the input image 4 more effectively.

The system 600a also includes a mask module 634 that generates a mask 34 associated with the input image 4. In particular, the mask module 634 detects pure white or near-white pixels 4a in the input image 4 and generates the mask 34 based on the detected pure white pixels and near white pixels 4a. For instance, the mask module 634 detects the pure white pixels and the near white pixels 4a in the input image 4 by detecting the pixels in the input image 4 with a RGB value that satisfies (e.g., is below) a threshold for near white. As such, the mask 34 marks the pure white pixels and the near white pixels 4a from the input image 4. For instance, the mask 34 may include mask bits 34a and one or more of the mask bits 34a are set to mark the pure white pixels and the near white pixels 4a detected in the input image 4.

Furthermore, the system 600a includes a mask upscaling module 644 that upscales the mask 34 to produce an upscaled mask 44 matching a resolution of the first upscaled image 14. For instance, the first upscaling module 614 may upscale the input image 4 by 4X, and the mask upscaling module 644 may correspondingly upscale the mask 34 by 4X. Upscaling the mask 34 may involve replicating the mask bits 34a of the mask 34 along two perpendicular axes (e.g., x-direction and y-direction) to match the resolution of the first upscaled image 14. The upscaled mask 44 includes mask bits 44a that are set to mark the pure white pixels and the near white pixels 4a detected in the input image 4.

The system 600a includes an output module 654a, which may be a multiplexer that receives the first upscaled image 14 from the first upscaling module 614, the second upscaled image 24 from the second upscaling module 624, and the upscaled mask 44 from the mask upscaling module 644. Evaluating the one or more set mask bits 44a of the upscaled mask 44, the output module 654a identifies one or more target pixels 14a of the first upscaled image 14 that correspond to the one or more set mask bits 34a in the upscaled mask 34. The output module 654a modifies the first upscaled image 14 to produce an output image 54a by replacing one or more of the target pixels 14a of the first upscaled image 14 with a replacement pixel. In the system 600a, the output module 654a replaces each target pixel 14a of the first upscaled image 14 with the corresponding white pixel 24a of the second upscaled image 24. In other words, the white pixels 24a of the second upscaled image 24 provide replacement pixels that reproduce the pure white pixels or near white pixels of the input image 4 more effectively. The system 600a protects the pure white pixels and near white pixels 4a of the input image 4.

Figure 7:
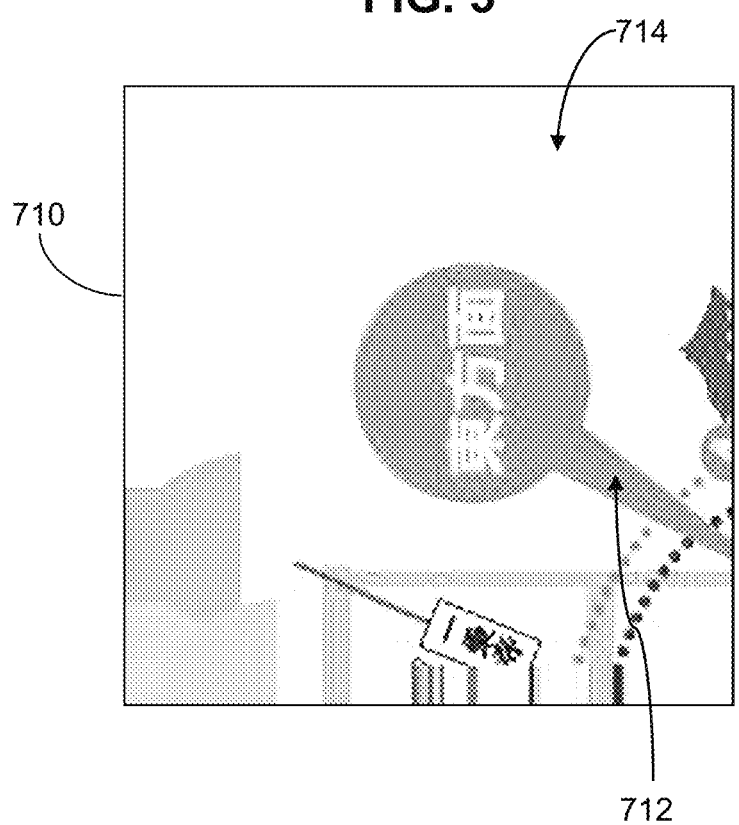
FIG. 7 illustrates an example image produced by applying a mask based on pure white pixels and near white pixels of the input image of FIG. 1 to the upscaled image of FIG. 2 produced by the SRGAN.

FIG. 7 illustrates an upscaled image 710 where a mask is employed to protect both the pure white pixels and the near white pixels of the input image 110 shown in FIG. 1, e.g., according to the system 600a. Based on a mask marking the pure white pixels and the near white pixels of the input image 110, the upscaled image 710 includes white areas 714 with pixels from the upscaled image 310 (nearest neighbor interpolation) and non-white components 712 with pixels from the upscaled image 210 (SRGAN). As shown in FIG. 7, the white areas 714 do not have the artifacts 514a of the white areas 514 shown in FIG. 5.

Figure 6B:
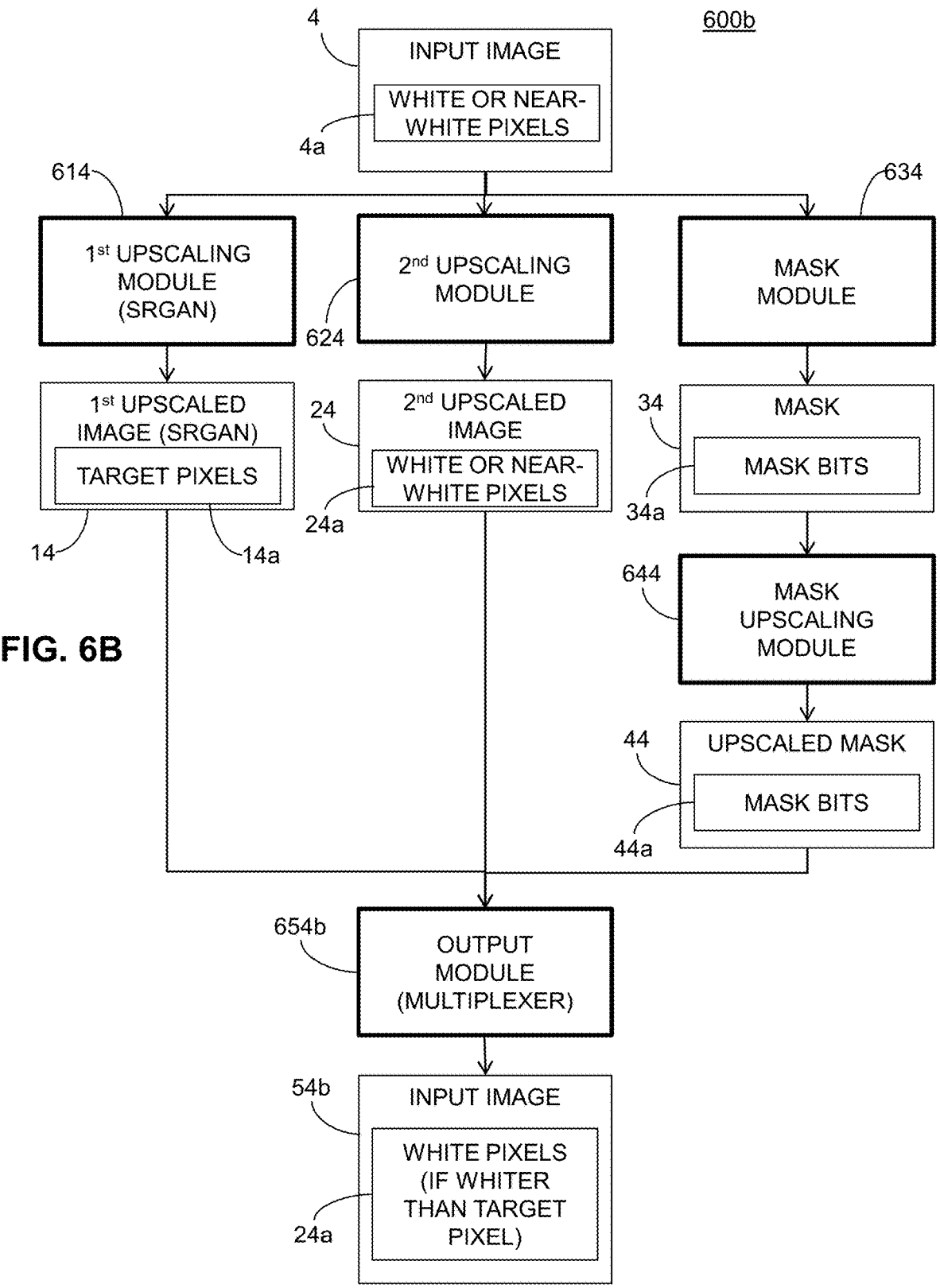
FIG. 6B illustrates a further example system for processing an input image, while protecting white areas in the input image.

FIG. 6B illustrates an alternative example system 600b for processing an input image 4 (e.g., for a print job). The system 600a protects the pure white pixels and near white pixels 4a of the input image 4. Aspects of the system 600b are similar to the system 600a. The system 600b includes the first upscaling module 614 which receives the input image 4 and employs a SRGAN to increase a resolution of the input image 4 to produce a first upscaled image 14. The system 600b includes the second upscaling module 624 that also receives the input image 4 and increases a resolution of the input image 4 to produce a second upscaled image 24 matching the resolution of the first upscaled image 14. For instance, the second upscaling module 624 may employ nearest neighbor interpolation or bilinear interpolation, as an alternative to the SRGAN. The system 600b also includes a mask module 634 that generates the mask 34 based on the detected pure white pixels and the detected near white pixels 4a. For instance, the mask module 634 detects the pure white pixels and the near white pixels 4a in the input image 4 by detecting the pixels in the input image 4 with a RGB value that satisfies (e.g., is below) a threshold for near white. Furthermore, the system 600b includes the mask upscaling module 644 which upscales the mask 34 to produce an upscaled mask 44 matching a resolution of the first upscaled image 14. The upscaled mask 44 includes mask bits 44a that are set to mark the pure white pixels and the near white pixels 4a detected in the input image 4.

The system 600b includes an output module 654b, which may be a multiplexer that receives the first upscaled image 14 from the first upscaling module 614, the second upscaled image 24 from the second upscaling module 624, and the upscaled mask 44 from the mask upscaling module 644. Evaluating the one or more set mask bits 44a of the upscaled mask 44, the output module 654b identifies one or more target pixels 14a of the first upscaled image 14 that correspond to the one or more set mask bits 34a in the upscaled mask 34. The output module 654 modifies the first upscaled image 14 to produce an output image 54 by replacing one or more of the target pixels 14a of the first upscaled image 14 with a replacement pixel. Unlike the output module 654a of the system 600a, the output module 654b determines, for each of the target pixels 14a of the first upscaled image 14, whether a corresponding pixel 24a of the second upscaled image 24 has greater whiteness than the target pixel 14a of the first upscaled image 14. Responsive to determining that the corresponding pixel 24a of the second upscaled image 24 has greater whiteness than the target pixel 14a of the first upscaled image 14, the output module 654b replaces the target pixel 14a of the first upscaled image 14 with the corresponding pixel 24a of the second upscaled image 24.

In general, the output modules 654a, b select pixels from the first upscaled image 14 or the second upscaled image 24 based on the mask bits 34a in the upscaled mask 34 marking the pure white pixels and the near white pixels 4 from the input image 4. If the first upscaled image 14 includes non-white components of higher image quality but the second upscaled image 24 includes pure white or near white areas of more acceptable quality, the output modules 654a, b can replace the target pixels 14a in the first upscaled image 14 with white pixels 24a from the second upscaled image 24. For instance, the output modules 654a, b select white pixels produced by nearest neighbor interpolation over corresponding pixels produced by the SRGAN. Not only are the pure white pixels of the input image 4 protected, but any near white pixel with a value satisfying the threshold is also protected.

The modules as illustrated in the figures may be stored on one or more computer storage devices and implemented on a computer processing system. For instance, the modules may be implemented as computer-executable instructions stored on one or more non-transitory computer-readable storage media and executable by one or more processors. In general, any aspect of the systems and methods described herein may be achieved by one or more processors executing computer-executable instructions stored on one or more non-transitory computer-readable storage media.

Figure 8:
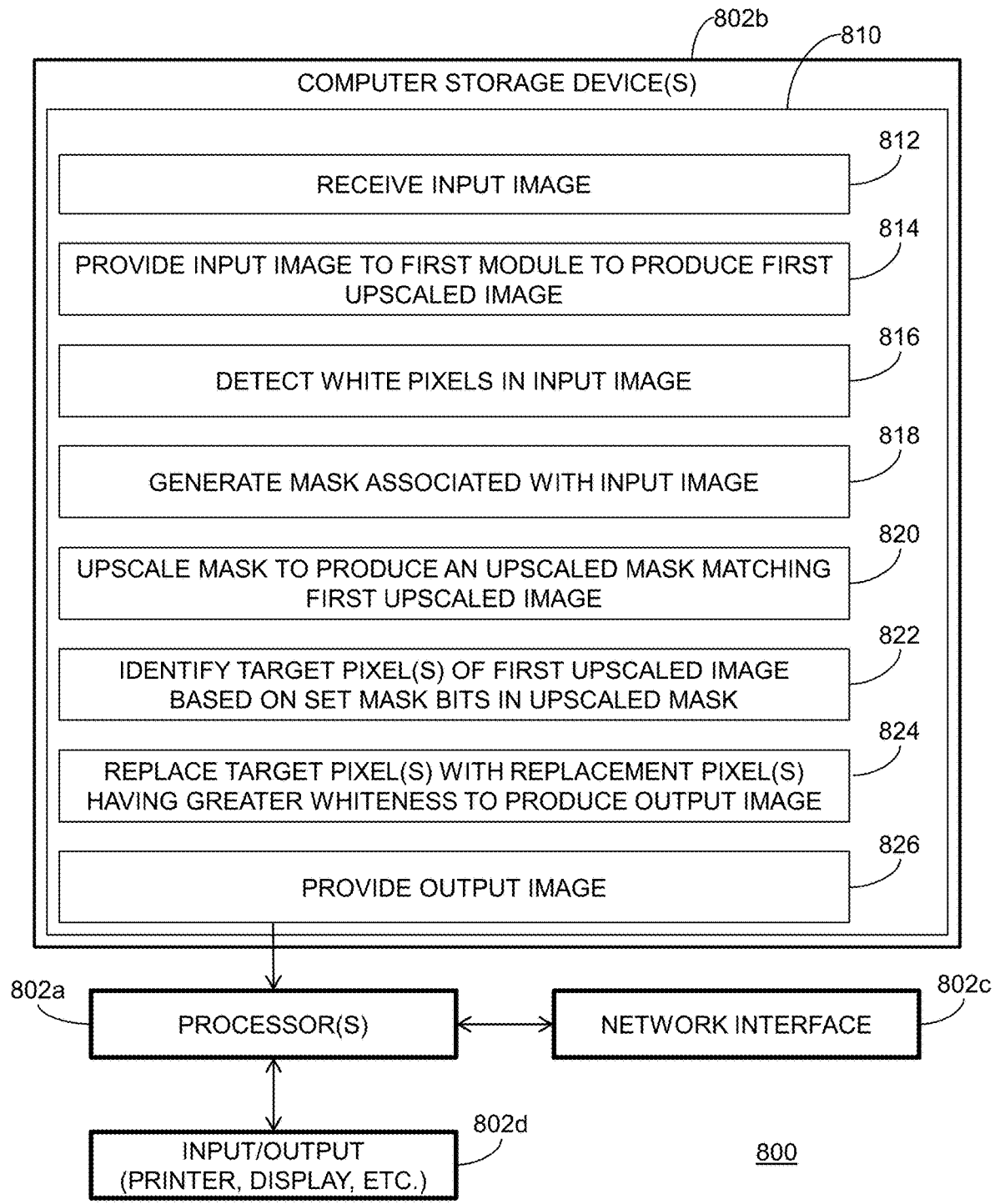
FIG. 8 illustrates an example computing system for processing an input image.

For instance, as shown in an example computing system 800 illustrated in FIG. 8, one or more non-transitory computer-readable storage media 802b can store instructions 810 that are executable to cause one or more processors 802a to: receive an input image in an act 812; provide the input image as input to a first module configured to increase a resolution of the input image to produce a first upscaled image in an act 814; detect white pixels in the input image in an act 816; generate a mask associated with the input image in an act 818, wherein the mask includes mask bits and one or more of the mask bits are set to mark the white pixels in the input image; upscale the mask to produce an upscaled mask matching a resolution of the first upscaled image in an act 820; identify one or more target pixels of the first upscaled image that correspond to the one or more set mask bits in the upscaled mask in an act 822; modify the first upscaled image to produce an output image by replacing one or more of the target pixels of the first upscaled image with a replacement pixel having greater whiteness in an act 824; and output the output image in an act 826.

The computing system 800 may be implemented as a mobile phone, tablet computer, wearable computer, desktop computer, laptop computer, smart device, or the like. The computing system 800 may include the one or more processors 802a, one or more computer storage devices 802b, including one or more non-transitory computer-readable storage media, a network interface 802c, and input/output devices 802d, all of which may be coupled by a system bus or a similar mechanism. The one or more processors 804a may include one or more central processing units (CPUs), such as one or more general purpose processors and/or one or more dedicated processors (e.g., application specific integrated circuits also known as ASICs or digital signal processors also known as DSPs, etc.).

The one or more computer storage devices 802b may include volatile and/or non-volatile data storage and may be integrated in whole or in part with the one or more processors 802a. In general, the one or more computer storage devices 802b may store program instructions, executable by the one or more processors 802a, and data that are manipulated by these instructions to carry out the various methods, processes, or functions described herein. Alternatively, these methods, processes, or functions can be defined by hardware, firmware, and/or any combination of hardware, firmware and software. Therefore, one or more computer storage devices 802b may include a tangible, non-transitory computer-readable medium, having stored thereon program instructions that, upon execution by one or more processors, cause computing system 800 to carry out any of the methods, processes, or functions disclosed in this specification or the accompanying drawings.

The network interface 802c may be employed to receive input, such as the input images described above, or to provide output, such as the output images described above. The network interface 802c may take the form of a wire line connection, such as an Ethernet, Token Ring, or T-carrier connection. The network interface 802c may alternatively take the form of a wireless connection, such as WiFi, BLUETOOTH®, or a wide-area wireless connection. However, other forms of physical layer connections and other types of standard or proprietary communication protocols may be used over network interface 802c. Furthermore, network interface 802c may comprise multiple physical communication interfaces. Additionally, the computing system 800 may support remote access from another device, via the network interface 802c or via another interface, such as an RS-132 or Universal Serial Bus (USB) port.

The input/output devices 802d may facilitate user interaction with the computing system 800. The input/output devices 802d may include multiple types of input devices, such as a keyboard, a mouse, a touch screen, a microphone and/or any other device that is capable of receiving input from a user. Similarly, the input/output function 802d may include multiple types of output devices, such as a printing device, a display, one or more light emitting diodes (LEDs), speaker, or any other device that is capable of providing output discernible to a user. For instance, the printing device can print the output image. Additionally or alternatively, the display device can display the output image.

It should be understood that the examples of a computing device are provided for illustrative purposes. Further, in addition to and/or alternatively to the examples above, other combinations and/or sub combinations of a printer, computer, and server may also exist, amongst other possibilities, without departing from the scope of the embodiments herein.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing images, comprising:
receiving an input image;
providing the input image as input to a first module implemented on a computer processing system and configured to increase a resolution of the input image to produce a first upscaled image;
detecting, with the computer processing system, white pixels in the input image;
generating, with the computer processing system, a mask associated with the input image, wherein the mask includes mask bits and one or more of the mask bits are set to mark the white pixels in the input image;
upscaling, with the computer processing system, the mask to produce an upscaled mask matching a resolution of the first upscaled image;
identifying, with the computer processing system, one or more target pixels of the first upscaled image that correspond to the one or more set mask bits in the upscaled mask;
modifying, with the computer processing system, the first upscaled image to produce an output image by replacing one or more of the target pixels of the first upscaled image with a replacement pixel having greater whiteness; and
outputting, by the computer processing system, the output image.

2. The method of claim 1, further comprising:
providing the input image as input to a second module implemented on the computer processing system and configured to increase a resolution of the input image to produce a second upscaled image matching the resolution of the first upscaled image,
wherein replacing one or more of the target pixels of the first upscaled image includes replacing each of the target pixels of the first upscaled image with a corresponding pixel of the second upscaled image having greater whiteness.

3. The method according to claim 2, wherein the second module increases the resolution of the input image via nearest neighbor interpolation or bilinear interpolation.

4. The method of claim 1, further comprising:
providing the input image as input to a second module implemented on the computer processing system and configured to increase a resolution of the input image to produce a second upscaled image matching the resolution of the first upscaled image,
wherein replacing one or more of the target pixels of the first upscaled image includes, for each of the target pixels of the first upscaled image:

determining whether a corresponding pixel of the second upscaled image has greater whiteness than the target pixel of the first upscaled image; and
responsive to determining that the corresponding pixel of the second upscaled image has greater whiteness than the target pixel of the first upscaled image, replacing the target pixel of the first upscaled image with the corresponding pixel of the second upscaled image.

5. The method according to claim 4, wherein the second module increases the resolution of the input image via nearest neighbor interpolation or bilinear interpolation.

6. The method according to claim 1, wherein detecting white pixels in the input image includes detecting pixels in the input image with a (red, green, blue) (RGB) value that satisfies a threshold.

7. The method of claim 1, wherein detecting white pixels in the input image includes detecting pixels in the input image with a red-green-blue (RGB) value of (255, 255, 255), and the replacement pixel for each of the target pixels of the first upscaled image has the RGB value of (255, 255, 255).

8. The method of claim 1, wherein the first module increases the resolution of the input image via a Super-Resolution Generative Adversarial Network (SRGAN).

9. The method of claim 1, wherein upscaling the mask includes replicating the mask bits of the mask along two perpendicular axes to match the resolution of the first upscaled image.

10. A system for processing images, the system comprising:
one or more computer storage devices configured to store a first module configured to increase a resolution of an input image to produce a first upscaled image; and
one or more processors configured to execute instructions, the instructions causing the one or more processors to:
receive the input image;
provide the input image as input to the first module to produce the first upscaled image;
detect white pixels in the input image;
generate a mask associated with the input image, wherein the mask includes mask bits and one or more of the mask bits are set to mark the white pixels in the input image;
upscale the mask to produce an upscaled mask matching a resolution of the first upscaled image;
identify one or more target pixels of the first upscaled image that correspond to the one or more set mask bits in the upscaled mask;
modify the first upscaled image to produce an output image by replacing one or more of the target pixels of the first upscaled image with a replacement pixel having greater whiteness; and
output the output image.

11. The system of claim 10, wherein the one or more computer storage devices are further configured to store a second module configured to increase a resolution of the input image to produce a second upscaled image,
the instructions further cause the one or more processors to provide the input image as input to the second module to produce the second upscaled image matching the resolution of the first upscaled image, and
replacing one or more of the target pixels of the first upscaled image includes replacing each of the target pixels of the first upscaled image with a corresponding pixel of the second upscaled image.

12. The system of claim 10, wherein the one or more computer storage devices are further configured to store a second module configured to increase a resolution of the input image to produce a second upscaled image, the instructions further cause the one or more processors to provide the input image as input to the second module to produce the second upscaled image matching the resolution of the first upscaled image, and replacing one or more of the target pixels of the first upscaled image includes, for each of the target pixels of the first upscaled image:

determining whether a corresponding pixel of the second upscaled image has greater whiteness than the target pixel of the first upscaled image; and responsive to determining that the corresponding pixel of the second upscaled image has greater whiteness than the target pixel of the first upscaled image, replacing the target pixel of the first upscaled image with the corresponding pixel of the second upscaled image.

13. The system of claim 10, wherein the instructions cause the one or more processors to detect white pixels in the input image by detecting pixels in the input image with a (red, green, blue) (RGB) value that satisfies a threshold.

14. The system of claim 10, wherein the instructions cause the one or more processors to detect white pixels in the input image by detecting pixels in the input image with a red-green-blue (RGB) value of (255, 255, 255), and the replacement pixel for each of the target pixels of the first upscaled image has the RGB value of (255, 255, 255).

15. The system of claim 10, wherein the first module increases the resolution of the input image via a Super-Resolution Generative Adversarial Network (SRGAN).

16. One or more non-transitory computer-readable storage media, having computer-executable instructions stored thereon, wherein when executed by one or more processors, the computer-executable instructions cause the one or more processors to:

receive an input image;
provide the input image as input to a first module configured to increase a resolution of the input image to produce a first upscaled image;
detect white pixels in the input image;
generate a mask associated with the input image, wherein the mask includes mask bits and one or more of the mask bits are set to mark the white pixels in the input image;
upscale the mask to produce an upscaled mask matching a resolution of the first upscaled image;
identify one or more target pixels of the first upscaled image that correspond to the one or more set mask bits in the upscaled mask;

modify the first upscaled image to produce an output image by replacing one or more of the target pixels of the first upscaled image with a replacement pixel having greater whiteness; and output the output image.

17. The one or more non-transitory computer-readable storage media of claim 16, wherein the computer-executable instructions further cause the one or more processors to:

provide the input image as input to a second module configured to increase a resolution of the input image to produce a second upscaled image matching the resolution of the first upscaled image, wherein replacing one or more of the target pixels of the first upscaled image includes replacing each of the target pixels of the first upscaled image with a corresponding pixel of the second upscaled image.

18. The one or more non-transitory computer-readable storage media of claim 16, wherein the computer-executable instructions further cause the one or more processors to:

provide the input image as input to a second module configured to increase a resolution of the input image to produce a second upscaled image matching the resolution of the first upscaled image, wherein replacing one or more of the target pixels of the first upscaled image includes, for each of the target pixels of the first upscaled image:

determining whether a corresponding pixel of the second upscaled image has greater whiteness than the target pixel of the first upscaled image; and responsive to determining that the corresponding pixel of the second upscaled image has greater whiteness than the target pixel of the first upscaled image, replacing the target pixel of the first upscaled image with the corresponding pixel of the second upscaled image.

19. The one or more non-transitory computer-readable storage media of claim 16, wherein the computer-executable instructions cause the one or more processors to detect white pixels in the input image by detecting pixels in the input image with a (red, green, blue) (RGB) value that satisfies a threshold.

20. The one or more non-transitory computer-readable storage media of claim 16, wherein the computer-executable instructions cause the one or more processors to detect white pixels in the input image by detecting pixels in the input image with a red-green-blue (RGB) value of (255, 255, 255), and the replacement pixel for each of the target pixels of the first upscaled image has the RGB value of (255, 255, 255).

* * * * *